(12) United States Patent
Gu

(10) Patent No.: US 11,694,294 B2
(45) Date of Patent: Jul. 4, 2023

(54) CARGO PROTECTION METHOD, DEVICE AND SYSTEM, AND NON-TRANSITORY COMPUTER-READABLE STORAGE MEDIUM

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Fei Gu, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 386 days.

(21) Appl. No.: 16/954,650

(22) PCT Filed: Sep. 30, 2018

(86) PCT No.: PCT/CN2018/108955
§ 371 (c)(1),
(2) Date: Jun. 17, 2020

(87) PCT Pub. No.: WO2019/119926
PCT Pub. Date: Jun. 27, 2019

(65) Prior Publication Data
US 2020/0385142 A1    Dec. 10, 2020

(30) Foreign Application Priority Data
Dec. 18, 2017    (CN) .......................... 201711363753.9

(51) Int. Cl.
*B64C 39/02*    (2023.01)
*G06Q 50/28*    (2012.01)
(Continued)

(52) U.S. Cl.
CPC ............. *G06Q 50/28* (2013.01); *B64D 45/04* (2013.01); *G01S 13/89* (2013.01); *G01S 13/933* (2020.01);
(Continued)

(58) Field of Classification Search
CPC ..... B64D 45/04; B64D 2201/00; G01S 13/89; G01S 13/933; G01S 7/418; G01S 13/935;
(Continued)

(56) References Cited

U.S. PATENT DOCUMENTS 8,979,023 B1 * 3/2015 Wang ..................... B64D 45/00
244/1 OOA
10,137,986 B1    11/2018 Bar-Zeev et al.
(Continued)

FOREIGN PATENT DOCUMENTS

CN    103034170 A    4/2013
CN    103895870 A    7/2014
(Continued)

OTHER PUBLICATIONS

Office Action dated Jun. 27, 2022, in corresponding Japanese Patent Application No. 2020-530580 (English Translation only), 3 pages.
(Continued)

*Primary Examiner* — Yonel Beaulieu
(74) *Attorney, Agent, or Firm* — Oblon, McClelland, Maier & Neustadt, L.L.P.

(57) ABSTRACT

The present disclosure relates to a cargo protection method, device and system, and a non-transitory computer-readable storage medium, relating to the technical field of unmanned aerial vehicles. The method of the present disclosure includes: determining whether an unmanned aerial vehicle is in a falling state or not according to a current acceleration in a vertical direction of the unmanned aerial vehicle and a current vertical distance from the unmanned aerial vehicle to
(Continued)

the ground; and opening at least one airbag in a cargo hold of the unmanned aerial vehicle in a case where the unmanned aerial vehicle is in the falling state to protect a cargo in the cargo hold.

18 Claims, 6 Drawing Sheets

(51) Int. Cl.
  *G01S 13/933* (2020.01)
  *G06N 7/00* (2023.01)
  *B64D 45/04* (2006.01)
  *G01S 13/89* (2006.01)
  *G05D 1/00* (2006.01)
  *G06V 10/24* (2022.01)
  *G05D 1/08* (2006.01)
  *G06N 7/01* (2023.01)

(52) U.S. Cl.
  CPC ............. *G05D 1/0808* (2013.01); *G06N 7/01* (2023.01); *G06V 10/24* (2022.01)

(58) Field of Classification Search
  CPC ..... G01S 13/881; G01S 13/00; G05D 1/0808; G05D 1/00; G06N 7/005; G06N 20/00; G06Q 50/28; G06Q 10/08; B64C 2201/128; B64C 39/024; B64C 39/02; G06K 9/00; G06V 10/24
  See application file for complete search history.

(56) References Cited

U.S. PATENT DOCUMENTS

| 10,404,299 | B1* | 9/2019 | Petre | G06K 9/0051 |
| 2017/0203843 | A1* | 7/2017 | Chan | B64D 1/08 |
| 2017/0334568 | A1 | 11/2017 | Luo | |
| 2018/0022310 | A1* | 1/2018 | Olson | B64D 25/00 244/1 OOA |
| 2019/0318296 | A1* | 10/2019 | Ifill | B64D 1/02 |
| 2020/0370920 | A1* | 11/2020 | Ahmed | G01C 21/3848 |
| 2020/0385142 | A1* | 12/2020 | Gu | G06Q 50/28 |
| 2021/0339842 | A1* | 11/2021 | Sauer | B64C 25/06 |
| 2022/0057519 | A1* | 2/2022 | Goldstein | G01S 17/04 |

FOREIGN PATENT DOCUMENTS

| CN | 105046835 A | 11/2015 | |
| CN | 105857590 A | 8/2016 | |
| CN | 206096454 U | 4/2017 | |
| CN | 106716285 A | 5/2017 | |
| CN | 106927057 A | 7/2017 | |
| CN | 107087429 A | 8/2017 | |
| JP | 2009-520621 A | 5/2009 | |
| JP | 2014-515131 A | 6/2014 | |
| JP | 2017-56822 A | 3/2017 | |
| KR | 10-2017-0129528 A | 11/2017 | |
| WO | WO 2017/032333 A1 | 3/2017 | |
| WO | WO 2018/117199 A1 | 6/2018 | |
| WO | WO-2018208629 A1 * | 11/2018 | B64C 37/02 |
| WO | WO-2019178637 A1 * | 9/2019 | B64D 25/12 |
| WO | WO-2021025739 A1 * | 2/2021 | B64C 27/52 |

OTHER PUBLICATIONS

International Search Report dated Dec. 28, 2018 in PCT/CN2018/108955 (with English translation), 7 pages.
International Preliminary Report on Patentability and Written Opinion of the International Searching Authority dated Jun. 23, 2020 in PCT/CN2018/108955 filed Jun. 11, 2018 (with English translation), 9 pages.
Combined Chinese Office Action and Search Report dated Aug. 31, 2020, in Patent Application No. 201711363753.9 (with English translation of Categories of Cited Documents), 13 pages.

* cited by examiner

```
┌─────────────────────────────────────────┐
│ Whether an unmanned aerial vehicle is in a │
│ falling state or not is determined according│─── S102
│    to a current acceleration in a vertical │
│ direction of the unmanned aerial vehicle and│
│ a current vertical distance from the unmanned│
│      aerial vehicle to the ground          │
└─────────────────────────────────────────┘
                    │
                    ▼
┌─────────────────────────────────────────┐
│ At least one airbag is opened in a cargo hold│
│   of the unmanned aerial vehicle in the case │─── S104
│  where the unmanned aerial vehicle is in the │
│ falling state to protect a cargo in the cargo│
│                   hold                      │
└─────────────────────────────────────────┘
```

Fig. 1

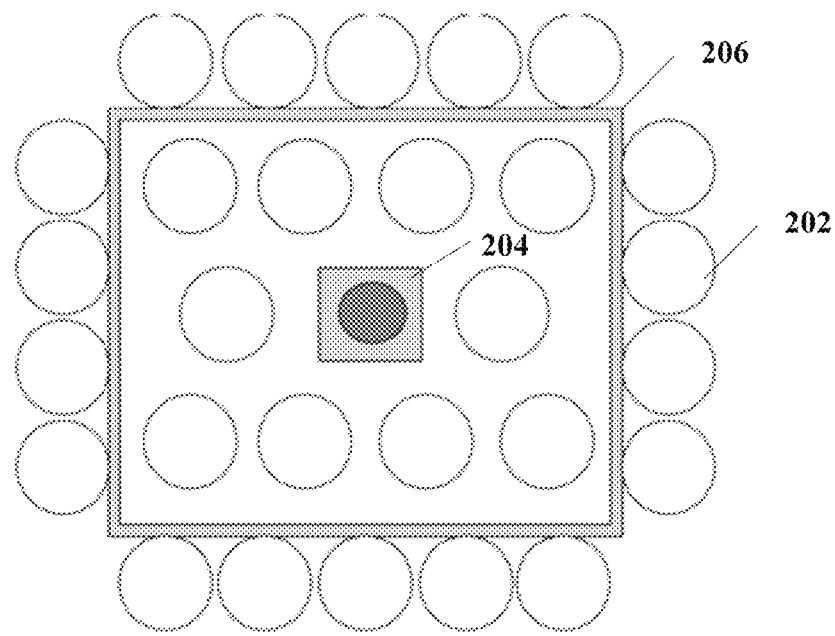

Fig. 2

CARGO PROTECTION METHOD, DEVICE AND SYSTEM, AND NON-TRANSITORY COMPUTER-READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2018/108955, filed on Sep. 30, 2018, which is based on and claims priority of Chinese application for invention No. 201711363753.9, filed on Dec. 18, 2017, the disclosure of both of which are hereby incorporated into this disclosure by reference in its entirety.

TECHNICAL FIELD

The present disclosure relates to the technical field of unmanned aerial vehicle, and in particular, to a cargo protection method, a cargo protection device, a cargo protection system, and a non-transitory computer-readable storage medium.

BACKGROUND

With the increasing application of unmanned aerial vehicles, the safety problem of unmanned aerial vehicles also begins to be concerned by people.

In terms of freight transportation, the technology of unmanned aerial vehicle has been relatively mature and the safety performance is also good, but the possibility of failure still exists. When an unmanned aerial vehicle is operating at high altitudes, once the f light system fails, it may cause damage to valuable cargoes, bringing irreparable losses to customers and businesses.

At present, there are more and more protection technologies for the falling of unmanned aerial vehicles. Most of these technologies use a built-in chip to intelligently monitor the falling of the unmanned aerial vehicle. In dangerous situations, the parachute of the unmanned aerial vehicle is automatically opened to protect the unmanned aerial vehicle while preventing any damage caused by the falling.

SUMMARY

According to some embodiments of the present disclosure, there is provided a cargo protection method comprising: determining whether an unmanned aerial vehicle is in a falling state or not according to a current acceleration in a vertical direction of the unmanned aerial vehicle and a current vertical distance from the unmanned aerial vehicle to the ground; and opening at least one airbag in a cargo hold of the unmanned aerial vehicle in a case where the unmanned aerial vehicle is in the falling state to protect a cargo in the cargo hold.

In some embodiments, the determining of whether the unmanned aerial vehicle is in the falling state or not according to the current acceleration in the vertical direction of the unmanned aerial vehicle and the current vertical distance from the unmanned aerial vehicle to the ground comprises: detecting the current acceleration in the vertical direction of the unmanned aerial vehicle; detecting the current vertical distance from the unmanned aerial vehicle to the ground in a case where the current acceleration reaches an acceleration threshold; and determining that the unmanned aerial vehicle is in the falling state in a case where the current vertical distance is lower than a distance threshold.

In some embodiments, opening at least one airbag in the cargo hold of the unmanned aerial vehicle in the case where the unmanned aerial vehicle is in the falling state comprises: determining a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state; determining open time for at least one airbag corresponding to the direction according to the type of the obstacle below the unmanned aerial vehicle and the direction of the obstacle relative to the unmanned aerial vehicle; and opening the airbag corresponding to the open time when the open time is reached.

In some embodiments, the method further comprises: opening the airbags currently located under the cargo after waiting for a preset time interval after opening the airbag, wherein the preset time interval is set according to the type of obstacle.

In some embodiments, the method further comprises: adjusting an attitude of the unmanned aerial vehicle according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle; and opening the airbags currently located under the cargo.

In some embodiments, determining the type of the obstacle below the unmanned aerial vehicle according to the information obtained from scanning the ground with the radar on the unmanned aerial vehicle comprises: reconstructing an echo for a target point in an image of a region of interest obtained from scanning the ground with the radar on the unmanned aerial vehicle; extracting a time domain feature and a frequency domain feature of the echo of the target point based on each of different azimuth angles to generate a time domain feature sequence and a frequency domain feature sequence of the target point, respectively; inputting the time domain feature sequence and the frequency domain feature sequence of the target point into a hidden Markov model to obtain output probabilities of the time domain feature sequence and the frequency domain feature sequence of the target point under the hidden Markov model, respectively; and determining the type of the obstacle corresponding to the target point according to the probabilities of the time domain feature sequence and the frequency domain feature sequence of the target point under the hidden Markov model.

In some embodiments, reconstructing the echo of the target point in the image of the region of interest comprises; performing a two-dimensional Fourier transform on the image of the region of interest to obtain a wavenumber domain image of the region of interest; mapping the wavenumber domain image into a frequency-azimuth domain according to a relationship between a frequency and an azimuth in the wavenumber domain to obtain a frequency-azimuth domain image of the region of interest; and performing an inverse Fourier transform on the frequency-azimuth domain image along an azimuth direction to obtain the echo of the target point.

In some embodiments, determining the type of the obstacle corresponding to the target point according to the probabilities of the time domain feature sequence and the frequency domain feature sequence of the target point under the hidden Markov model comprises: taking the probabilities of the time domain feature sequence and the frequency domain feature sequence of the target point under the hidden Markov model as a probability feature of the target point; and determining the type of the obstacle corresponding to the target point according to a distribution of the probability feature of the target point and distributions of probability features of sample target points belonging to each type of obstacles.

According to still further embodiments of the present disclosure, there is provided a cargo protection device comprising: a processor; and a memory coupled to the processor and storing instructions that when executed by the processor, cause the processor to: determine whether an unmanned aerial vehicle is in a falling state or not according to a current acceleration in a vertical direction of the unmanned aerial vehicle and a current vertical distance from the unmanned aerial vehicle to the ground; and open at least one airbag in a cargo hold of the unmanned aerial vehicle in a case where the unmanned aerial vehicle is in the falling state to protect a cargo in the cargo hold.

In some embodiments, the determining of whether the unmanned aerial vehicle is in the falling state or not according to the current acceleration in the vertical direction of the unmanned aerial vehicle and the current vertical distance from the unmanned aerial vehicle to the ground comprises: detecting the current acceleration in the vertical direction of the unmanned aerial vehicle; detecting the current vertical distance from the unmanned aerial vehicle to the ground in a case where the current acceleration reaches an acceleration threshold; and determining that the unmanned aerial vehicle is in the falling state in a case where the current vertical distance is lower than a distance threshold.

In some embodiments, opening at least one airbag in the cargo hold of the unmanned aerial vehicle in the case where the unmanned aerial vehicle is in the falling state comprises: determining a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state; determining open time for at least one airbag corresponding to the direction according to the type of the obstacle below the unmanned aerial vehicle and the direction of the obstacle relative to the unmanned aerial vehicle; and opening the airbag corresponding to the open time when the open time is reached.

In some embodiments, the memory further storing instructions which, when executed by a processor, cause the processor to: open the airbags currently located under the cargo after waiting for a preset time interval after opening the airbag, wherein the preset time interval is set according to the type of the obstacle.

In some embodiments, the memory further storing instructions which, when executed by a processor, cause the processor to: adjust an attitude of the unmanned aerial vehicle according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle; and open the airbags currently located under the cargo.

In some embodiments, determining the type of the obstacle below the unmanned aerial vehicle according to the information obtained from scanning the ground with the radar on the unmanned aerial vehicle comprises: reconstructing an echo for a target point in an image of a region of interest obtained from scanning the ground with the radar on the unmanned aerial vehicle; extracting a time domain feature and a frequency domain feature of the echo of the target point based on each of different azimuth angles to generate a time domain feature sequence and a frequency domain feature sequence of the target point, respectively; inputting the time domain feature sequence and the frequency domain feature sequence of the target point into a hidden Markov model to obtain output probabilities of the time domain feature sequence and the frequency domain feature sequence of the target point under the hidden Markov model, respectively; and determining the type of the obstacle corresponding to the target point according to the probabilities of the time domain feature sequence and the frequency domain feature sequence of the target point under the hidden Markov model.

In some embodiments, reconstructing the echo of the target point in the image of the region of interest comprises: performing a two-dimensional Fourier transform on the image of the region of interest to obtain a wavenumber domain image of the region of interest; mapping the wavenumber domain image into a frequency-azimuth domain according to a relationship between a frequency and an azimuth in the wavenumber domain to obtain a frequency-azimuth domain image of the region of interest; and performing an inverse Fourier transform on the frequency-azimuth domain image along an azimuth direction to obtain the echo of the target point.

In some embodiments, determining the type of the obstacle corresponding to the target point according to the probabilities of the time domain feature sequence and the frequency domain feature sequence of the target point under the hidden Markov model comprises:

taking the probabilities of the time domain feature sequence and the frequency domain feature sequence of the target point under the hidden Markov model as a probability feature of the target point; and determining the type of the obstacle corresponding to the target point according to a distribution of the probability feature of the target point and distributions of probability features of sample target points belonging to each type of obstacles.

According to still further embodiments of the present disclosure, there is provided a non-transitory computer-readable storage medium storing computer program instructions, when executed by a processor, cause the processor to: determine whether an unmanned aerial vehicle is in a falling state or not according to a current acceleration in a vertical direction of the unmanned aerial vehicle and a current vertical distance from the unmanned aerial vehicle to the ground; and open at least one airbag in a cargo hold of the unmanned aerial vehicle in a case where the unmanned aerial vehicle is in the falling state to protect a cargo in the cargo hold.

In some embodiments, the determining of whether the unmanned aerial vehicle is in the falling state or not according to the current acceleration in the vertical direction of the unmanned aerial vehicle and the current vertical distance from the unmanned aerial vehicle to the ground comprises: detecting the current acceleration in the vertical direction of the unmanned aerial vehicle; detecting the current vertical distance from the unmanned aerial vehicle to the ground in a case where the current acceleration reaches an acceleration threshold; and determining that the unmanned aerial vehicle is in the falling state in a case where the current vertical distance is lower than a distance threshold.

In some embodiments, opening at least one airbag in the cargo hold of the unmanned aerial vehicle in the case where the unmanned aerial vehicle is in the falling state comprises:

determining a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state; determining open time for at least one airbag corresponding to the direction according to the type of the obstacle below the unmanned aerial vehicle and the direction of the obstacle relative to the unmanned aerial vehicle; and opening the airbag corresponding to the open time when the open time is reached.

In some embodiments, the non-transitory computer-readable storage medium further storing computer program instructions which, when executed by a processor, cause the processor to: open the airbags currently located under the cargo after waiting for a preset time interval after opening the airbag, wherein the preset time interval is set according to the type of the obstacle.

In some embodiments, the non-transitory computer-readable storage medium further storing computer program instructions which, when executed by a processor, cause the processor to: adjust an attitude of the unmanned aerial vehicle according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle; and open the airbags currently located under the cargo.

In some embodiments, determining the type of the obstacle below the unmanned aerial vehicle according to the information obtained from scanning the ground with the radar on the unmanned aerial vehicle comprises: reconstructing an echo for a target point in an image of a region of interest obtained from scanning the ground with the radar on the unmanned aerial vehicle; extracting a time domain feature and a frequency domain feature of the echo of the target point based on each of different azimuth angles to generate a time domain feature sequence and a frequency domain feature sequence of the target point, respectively; inputting the time domain feature sequence and the frequency domain feature sequence of the target point into a hidden Markov model to obtain output probabilities of the time domain feature sequence and the frequency domain feature sequence of the target point under the hidden Markov model, respectively; and determining the type of the obstacle corresponding to the target point according to the probabilities of the time domain feature sequence and the frequency domain feature sequence of the target point under the hidden Markov model.

In some embodiments, reconstructing the echo of the target point in the image of the region of interest comprises: performing a two-dimensional Fourier transform on the image of the region of interest to obtain a wavenumber domain image of the region of interest; mapping the wavenumber domain image into a frequency-azimuth domain according to a relationship between a frequency and an azimuth in the wavenumber domain to obtain a frequency-azimuth domain image of the region of interest; and performing an inverse Fourier transform on the frequency-azimuth domain image along an azimuth direction to obtain the echo of the target point.

In some embodiments, determining the type of the obstacle corresponding to the target point according to the probabilities of the time domain feature sequence and the frequency domain feature sequence of the target point under the hidden Markov model comprises: taking the probabilities of the time domain feature sequence and the frequency domain feature sequence of the target point under the hidden Markov model as a probability feature of the target point; and determining the type of the obstacle corresponding to the target point according to a distribution of the probability feature of the target point and distributions of probability features of sample target points belonging to each type of obstacles.

According to still further embodiments of the present disclosure, there is provided a cargo protection system comprising: the cargo protection device of any of the above embodiments and a plurality of airbags arranged around the cargo in the cargo hold of the unmanned aerial vehicle.

In some embodiments, the airbags are explosive-type airbags, which are divided into at least one airbag group according to the position of the airbags, and airbags in each of the at least one airbag group are connected to the same ignition device in parallel.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the disclosure and not to limit the disclosure. In the drawings:

FIG. 1 illustrates a flow diagram of a cargo protection method of some embodiments of the present disclosure.

FIG. 2 illustrates a top view of an airbag distribution in a cargo hold of an unmanned aerial vehicle of some embodiments of the present disclosure.

DETAILED DESCRIPTION

Figure 3:
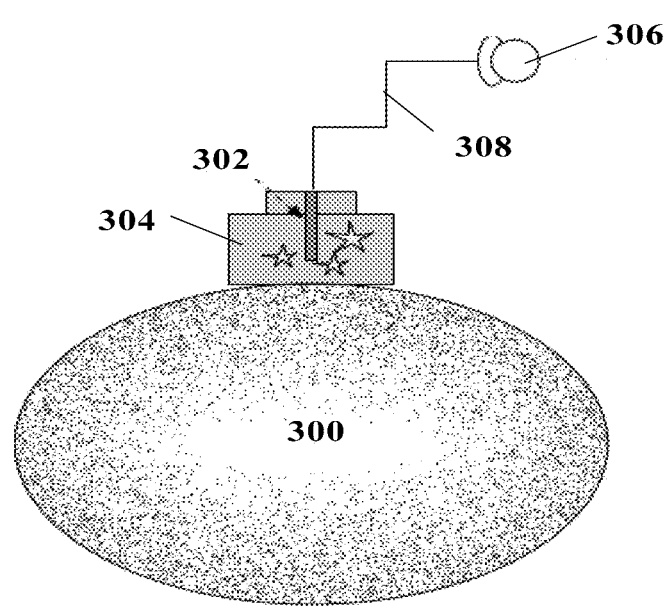
FIG. 3 shows a schematic structural view of an airbag of some embodiments of the present disclosure.

The technical solutions in the embodiments of the present disclosure will be described clearly and completely with reference to the drawings in the embodiments of the present disclosure, and it is obvious that the embodiments described are only some, instead of all, of the embodiments of the present disclosure. The following description of at least one exemplary embodiment is merely illustrative in nature and is in no way intended to limit the present disclosure, its application, or uses. All other embodiments, which can be obtained by a person skilled in the art from the embodiments disclosed herein without making any creative effort, shall fall within the protection scope of the present disclosure.

The inventor finds that, at present, once an unmanned aerial vehicle is detected to be out of control or in a stalling state, a parachute is automatically thrown in the air for protection. However, only the unmanned aerial vehicle itself is protected, while the protection for the cargo it carries is insufficient, and fragile or valuable cargo cannot be protected. Moreover, the parachute is slow in the reaction of opening which takes a long time. The landing site may not be selected autonomously by the unmanned aerial vehicle in an out-of-control state, and landing failures are prone to occur when there are obstacles on the ground. Even with fall protection devices, damage to the unmanned aerial vehicle and the cargo cannot be avoided.

A technical problem to be solved by this disclosure is: how to improve the safety of the cargo in the unmanned aerial vehicle and reduce the probability of damage of the cargo.

In order to solve the problem of insufficient protection of the cargo during a transportation by an unmanned aerial vehicle, which may easily cause damage to the cargo when the unmanned aerial vehicle falls, this solution is proposed. The cargo protection method of the present disclosure is described below with reference to FIG. 1.

FIG. 1 is a flow chart of some embodiments of the cargo protection method in the present disclosure. As shown in FIG. 1, the method of this embodiment comprises: steps S102 to S104.

In step S102, whether an unmanned aerial vehicle is in a falling state or not is determined according to a current acceleration in a vertical direction of the unmanned aerial vehicle and a current vertical distance from the unmanned aerial vehicle to the ground.

In some embodiments, the current acceleration in the vertical direction of the unmanned aerial vehicle is detected first. Then the current vertical distance from the unmanned aerial vehicle to the ground is detected in a case where the current acceleration reaches an acceleration threshold. It is determined that the unmanned aerial vehicle is in the falling state in a case where the current vertical distance is lower than a distance threshold. The acceleration in the vertical direction of the unmanned aerial vehicle can be detected through an acceleration sensor. The vertical distance from the unmanned aerial vehicle to the ground can be detected through an ultrasonic ranging system, ranging radar and the like. The acceleration in the vertical direction of unmanned aerial vehicle and the vertical distance from the unmanned aerial vehicle to ground can be detected periodically. Once it is discovered that the falling state is met, the subsequent measure of protection is executed immediately.

In step S104, at least one airbag is opened in a cargo hold of the unmanned aerial vehicle in the case where the unmanned aerial vehicle is in the falling state to protect a cargo in the cargo hold.

A plurality of airbags arranged around the cargo may be disposed within the cargo hold of the unmanned aerial vehicle. The size, number and position of the airbags can be adjusted according to the size of the actual cargo and the space of the cargo hold. In order to further strengthen the protection of the cargo, multiple airbags can be placed around the outside of the cargo hold. FIG. 2 is a top view of a distribution of the airbags in the cargo hold of the unmanned aerial vehicle in some embodiments. A plurality of airbags 202 are arranged around the cargo 204 and around the cargo hold 206. At the same time, a plurality of airbags can be disposed on the unmanned aerial vehicle and distributed in various parts of the unmanned aerial vehicle. The airbags disposed on the unmanned aerial vehicle can be opened simultaneously with the airbags in the cargo hold in a direction corresponding to the airbags disposed on the unmanned aerial vehicle to protect the unmanned aerial vehicle when the unmanned aerial vehicle is in a falling state. The airbags can be used in cooperation with a parachute mounted on unmanned aerial vehicle. In the case where the unmanned aerial vehicle is in a falling state, the parachute can reduce the speed of the falling of the unmanned aerial vehicle. With the opening of the airbags in the cargo hold, around the cargo hold or on the unmanned aerial vehicle, the cargo or the unmanned aerial vehicle can be better protected.

In some embodiments, the unmanned aerial vehicle may detect the current flight attitude. For example, the unmanned aerial vehicle may detect an inclination angle of the unmanned aerial vehicle with respect to the horizontal direction using a gyroscope. A part contacting the ground is determined when falling to the ground according to the flight attitude, and at least one of the airbags is opened on the part or on a part corresponding to the part. For example, when the unmanned aerial vehicle falls parallel to the ground, the bottom of the unmanned aerial vehicle first contacts the ground, the airbags at the bottom of the cargo may be mainly opened, and the airbags at the bottom of the unmanned aerial vehicle may be opened, while the airbags on the top of the unmanned aerial vehicle or the airbags on the top of the cargo hold may not be opened or may be opened later than the opening of the airbags at the bottom. For another example, when the head of the unmanned aerial vehicle falls down, the airbags at the head of the unmanned aerial vehicle or the airbags in a direction corresponding to the head in the cargo hold may be opened preferentially. The preferentially opened airbags can have a function of protection at first when the unmanned aerial vehicle falls. Further, when an impact force on some parts reaches an impact force threshold in the case where the unmanned aerial vehicle in the falling state, the airbags on the parts or on parts corresponding to the parts can be triggered to open for continuous protection.

Further, in a case where the unmanned aerial vehicle can automatically adjust the flying attitude, the flying attitude can be adjusted to select the part that touches the ground when to the ground and the airbags of the art or on a part corresponding to the parts is opened.

FIG. 3 is a schematic structural view of a single airbag. The airbag is, for example, an explosion-type airbag. A detonator 302 is arranged on the airbag 300 and is positioned in a gas generator 304. The electronic ignition device 306 can ignite the detonator 302 through the lead 308, and further the detonator 302 ignites the surrounding reactants to generate gas to fill the airbag. The reactant is, for example, sodium azide, which may generate rapid thermal decomposition reaction upon impact or heat, so that gas is generated. In a case where there is a plurality of airbags, the airbags can be divided into at least one airbag group according to their position. The airbags in each of the at least one airbag group are connected to the same ignition device in parallel and can be opened simultaneously. The explosive airbags and the parallel arrangement mode can further accelerate the opening speed of the airbags and improve the safety of cargo.

In the method of the above embodiment, the plurality of airbags arranged is disposed around the cargo in the cargo hold of the unmanned aerial vehicle. In the case where an unmanned aerial vehicle is in the falling state, at least one of the airbags is opened. The airbag is opened more timely than a parachute, which can directly prevent the cargo from being impacted and reduce the probability of damage to the unmanned aerial vehicle.

In the case where the unmanned aerial vehicle in the falling state, the unmanned aerial vehicle can also scan the ground automatically, determines whether there is an obstacle on the ground according to the scanned image, and determines a mode of opening the airbag according to the obstacle on ground or to avoid the obstacle. Further embodiments of the cargo protection method of the present disclosure are described below with reference to FIGS. 4A and 4B.

Figure 4A:
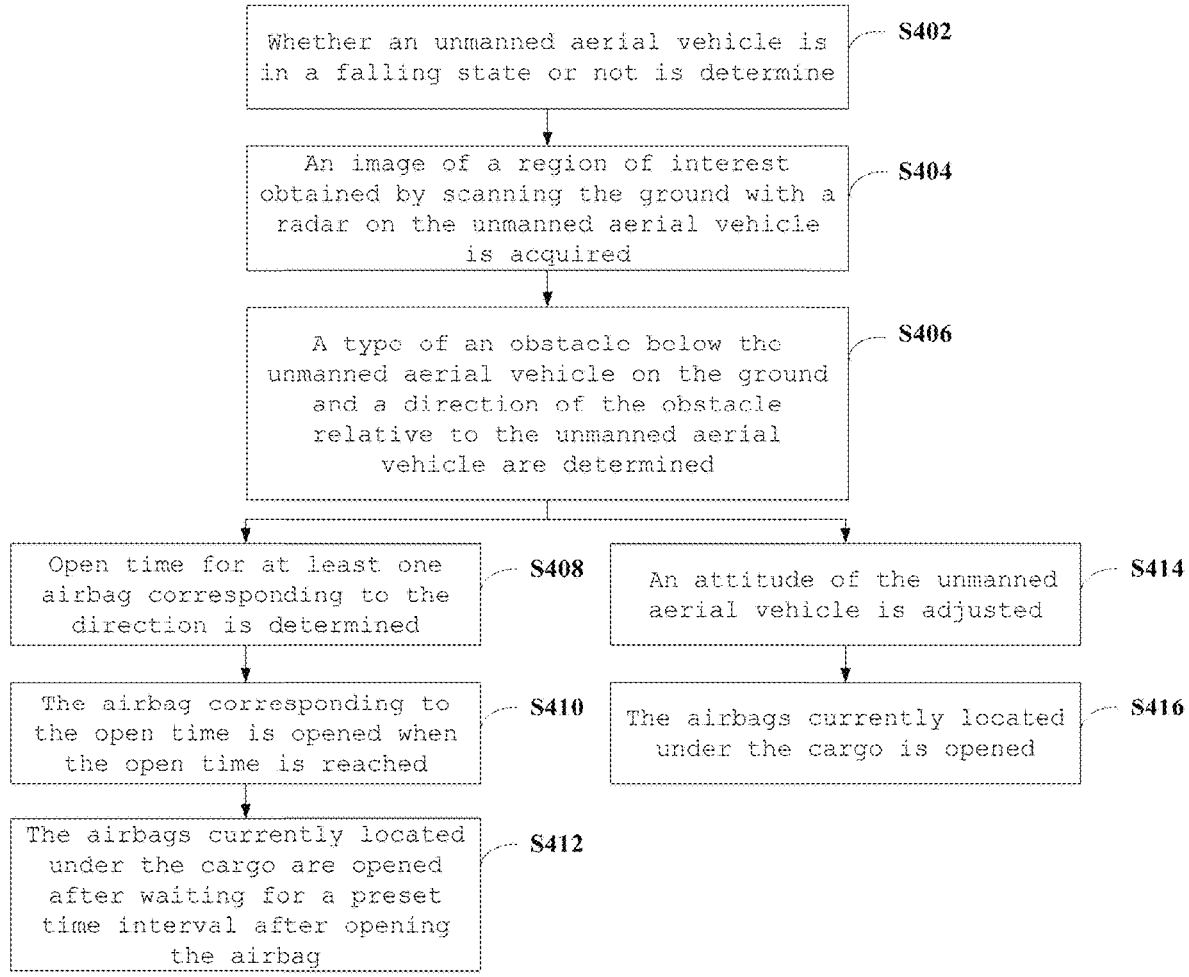
FIG. 4A illustrates a flow diagram of a cargo protection method of further embodiments of the present disclosure.

FIG. 4A is a flow chart of other embodiments of the cargo protection method of the present disclosure. As shown in FIG. 4A, the method of this embodiment comprises: steps S402-S416.

In step S402, whether an unmanned aerial vehicle is in a falling state or not is determined according to a current acceleration in a vertical direction of the unmanned aerial vehicle and a current vertical distance from the unmanned aerial vehicle to the ground. If the unmanned aerial vehicle is in the falling state, the step S404 is executed, otherwise, the step S402 is executed again after a preset period.

In step S404, an image of a region of interest obtained from scanning the ground with a radar on the unmanned aerial vehicle is acquired.

A radar detection device can be set on the unmanned aerial vehicle to survey the ground and obtain radar detection image. From the radar detection image, an image of a ROI (Region of Interest) can be extracted according to local gray features. The image of the ROI comprises at least one target point, and is a slant distance-azimuth image.

In step S406, a type of an obstacle below the unmanned aerial vehicle on the ground and a direction of the obstacle relative to the unmanned aerial vehicle are determined according to the image of the region of interest.

Figure 4B:
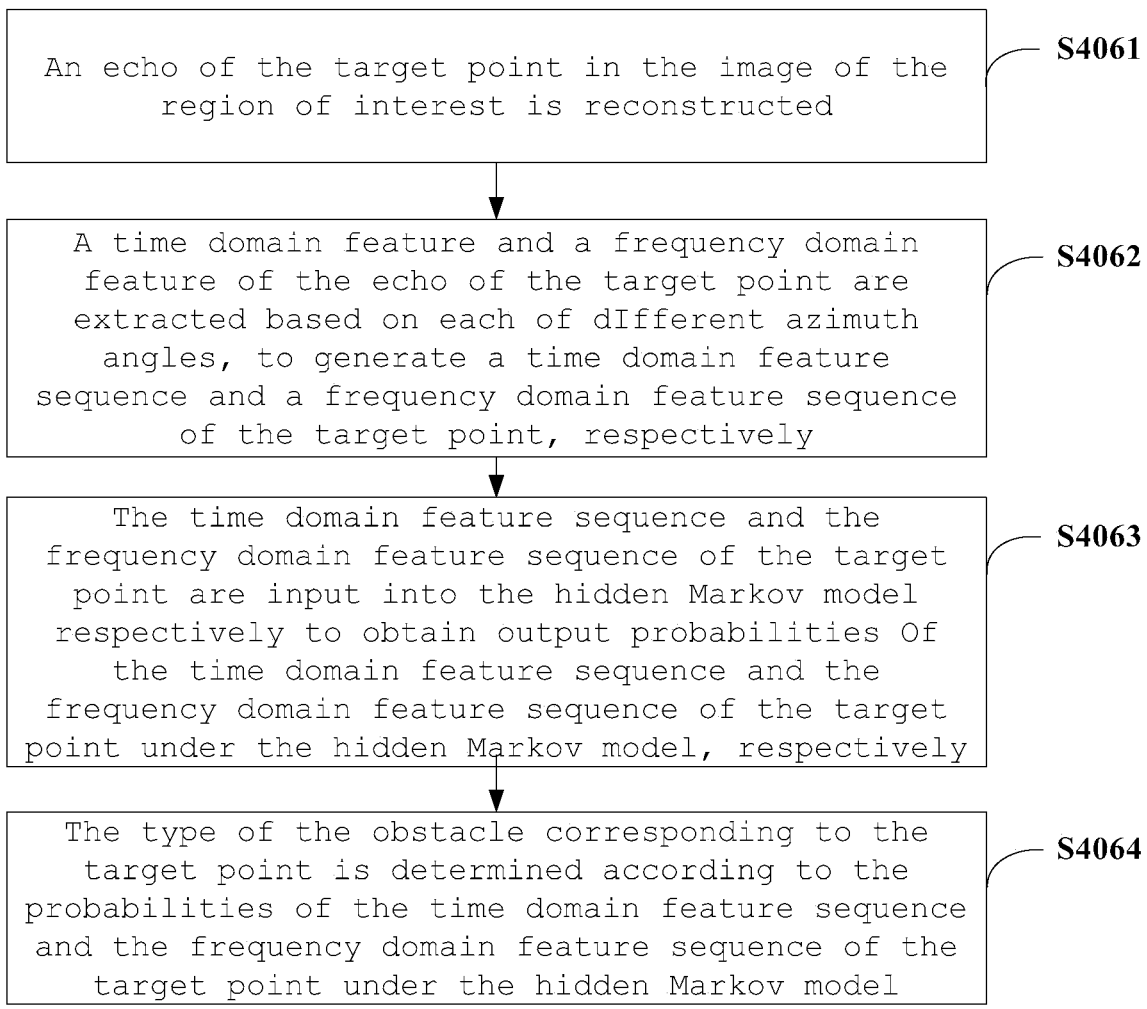
FIG. 4B illustrates a flow diagram of a cargo protection method of still further embodiments of the disclosure.

In some embodiments, as shown in FIG. 4B, for each of the at least one target point, the step S406 may comprise sub-steps S4061-S4064 as follows.

In step S4061, an echo of the target point in the image of the region of interest is reconstructed.

In some embodiments, a two-dimensional Fourier transform is performed on the image of the region of interest to obtain a wavenumber domain image of the region of interest. The wavenumber domain image is mapped into a frequency-azimuth domain according to a relationship between a frequency and an azimuth in the wavenumber domain to obtain a frequency-azimuth domain image of the region of interest. And an inverse Fourier transform is performed on the frequency-azimuth domain image along an azimuth direction to obtain the echo of the target point.

Assuming that the image of the ROI is represented as f(x,r), the two-dimensional Fourier transform is performed on it to obtain the wavenumber domain image $\tilde{F}(k_x, k_r)$, where x and r represent a slant distance and an azimuth position, respectively, and $k_x$ and $k_r$ represent a slant distance wavenumber and a azimuth wavenumber, respectively. According to the back projection imaging algorithm model, the following formula exists.

$$\begin{cases} k_x = 2k \sin \varphi \\ k_r = 2k \cos \varphi \end{cases} \quad (1)$$

$$k = \frac{2\pi f}{c},$$

where f denotes frequency and c denotes speed of light. $\tilde{F}(k_x, k_r)$ may be mapped to the f-φ domain according to equation (1), i.e. the frequency-azimuth domain, to form a frequency response of the target point at each of various incident angles. In the f-φ domain, the echo corresponding to the target point at an azimuth angle φ can be obtained from performing an inverse Fourier transform along the azimuth angle φ.

In step S4062, a time domain feature and a frequency domain feature of the echo of the target point are extracted based on each of different azimuth angles, to generate a time domain feature sequence and a frequency domain feature sequence of the target point, respectively.

The time-frequency atom decomposition algorism can be used to extract the time domain feature and the frequency domain feature of the echo of the target point at each of different azimuth angles, such as to extract a distance between every two adjacent peaks in the time domain and concave points in the frequency domain. The time-frequency atom decomposition algorism is the prior art and is not described herein again.

For example, the time domain feature is denoted by t, and the frequency domain feature is denoted by f, and an equal azimuth angle sampling is performed N times on the echo of the target point in the time domain and frequency domain, respectively, to obtain $t=(t_1, t_2, \ldots t_N)$, $f=(f_1, f_2, \ldots f_N)$.

In step S4063, the time domain feature sequence and the frequency domain feature sequence of the target point are input into the hidden Markov model to obtain output probabilities of the time domain feature sequence and the frequency domain feature sequence of the target point under the hidden Markov model, respectively.

Since the unmanned aerial vehicle is moving when the radar detection is performed, that is, the azimuth angle of the radar signal relative to the target point is time varying, the time domain features or the frequency domain features extracted based on the azimuth angles form a time varying sequence. Thus, HMM (Hidden Markov Model) can be used to identify the time domain feature sequence and the frequency domain feature sequence of the target point.

Different types of target points (such as trees, stones, buildings, automobiles, people, and the like) have different echoes due to different shapes, structures, and the like, and thus have different time domain features and frequency domain features, either. Thus, the type of the target point may be identified using the time domain features and the frequency domain features.

The parameters of the HMM mainly comprise an initial state distribution n, a state transition probability matrix B, and an observation probability matrix U that represents occurrence probabilities of different visible states (observed values) under different hidden states. In the time domain or the frequency domain, let each azimuth angle sampling value of the echo of the target point be a hidden state, represented as $X_n$=1, 2, . . . , N. N is the number of the hidden states, which is a positive integer. The initial probability of Xn is 1, that is, $P(X_n)$=1. According to the extraction process of the time domain feature sequence or the frequency domain feature sequence, it can be known that the corresponding hidden state is fixed. Therefore, the state transition probability matrix B={$b_{mn}$|m,n=1, 2, . . . , N} is in accordance with the following formula.

$$b_{mn} = \begin{cases} 1, m = n - 1 \\ 0, m \neq n - 1 \end{cases} \quad (2)$$

The HMM training process is simplified to solve for the observation probability matrix U. Based on the feature that the time domain feature sequence or the frequency domain feature sequence is a continuous random variable, U can be determined according to occurrence probabilities of the observed values. Further, assuming the trained HMM model is γ, after the observation probability matrix U is determined, for the time domain feature sequence t of the target point, P(t|γ) can be obtained, that is, the probabilities of generating the time domain feature sequence t under the HMM γ, and for the frequency domain feature sequence f of the target point P(f|γ), can be obtained, that is, the probability of generating the frequency domain feature sequence f under the HMM γ. The HMM model is an existing model, and the determination process of the HMM model can refer to the existing methods.

In step S4064, the type of the obstacle corresponding to the target point is determined according to the probabilities of the time domain feature sequence and the frequency domain feature sequence of the target point under the hidden Markov model.

In some embodiments, the probabilities of the time domain feature sequence and the frequency domain feature sequence of the target point under the hidden Markov model is token as a probability feature of the target point; and the type of the obstacle corresponding to the target point is determined according to a distribution of the probability feature of the target point and distributions of probability features of sample target points belonging to each type of obstacles.

The time domain feature sequences and the frequency domain feature sequences of sample target points are used as training samples to train the HMM model, respectively, and two HMM models can be obtained. Further, the probability $P(t^i|\gamma_t)$ of the time domain feature sequence $t^i$ of each sample target point i under the corresponding HMM model $\gamma_t$ can be obtained, where i is a positive integer. And the probability $P(f^i|\gamma_f)$ of the frequency domain feature sequence of each sample target point i under the corresponding HMM model $\gamma_t$ can be obtained. The $P(t^i|\gamma_t)$ and $P(f^i|\gamma_f)$ corresponding to the sample target point i form a new vector $v^i=(P(t^i|\gamma_t), P(f^i|\gamma_f))$ as a probability feature of the sample target point i.

The training samples comprise a plurality of training samples of various types of obstacles as sample target points, and the type of the obstacle corresponding to each training sample can be labeled. After training of the HMM model is completed by using the training samples, $v^i$ corresponding to each sample target point i can be obtained, and accordingly a vector corresponding to a sample target point set is formed, $V=(v^1, v^2, \ldots, v^M)$, where M is the number of target point samples and is a positive integer. The distribution of the probability feature of each sample target point may be represented by a distance of the probability feature of the sample target point to the sample target point set. The distance from the probability feature of the sample target point i to the sample target point set is calculated according to the following formula.

$$\varepsilon = \frac{1}{M-1} \sum_{i=1}^{M} (v^i - \bar{v})(v^i - \bar{v})^T \quad (3)$$

$$d(v^i - \bar{v}) = \sqrt{(v^i - \bar{v})^T \varepsilon^{-1} (v^i - \bar{v})} \quad (4)$$

$d(v^i-\bar{v})$ is a distance from the sample target point i to the sample target point set, wherein $\bar{v}$ is the mean of $v^i$. For each types of obstacles, statistics is made regarding the distributions of the probability features of sample target points corresponding to the type of obstacles. The echoes of sample target points corresponding to other types of obstacles are taken as clutters, and statistics is made regarding the distribution of the probability features of the sample target points corresponding to the clutters to distinguish the type of obstacles from the obstacles corresponding to the clutters. For example, for an obstacle such as a tree, statistics is made regarding the distance from the probability feature of each sample target point labeled as a tree to the sample target point set. Meanwhile, by taking the echoes of the remaining sample target points as clutters, statistics is made regarding the distances from the probability features of the sample target points corresponding to the clutters to the sample target point set. The statistic results can be obtained that in a case where the sample target points are trees, $d(v^i-\bar{v})>$Thr, and in a case where the sample target points are the sample target points corresponding to the clutters, $d(v^i-\bar{v})>$Thr. The trees can be distinguished from other obstacles according to the above results. Of course, according to the actual situation, the probability features of different obstacles may present different, distributions, and one distribution feature (statistic result) of probability features may be determined for each type of obstacles through training and statistics.

After training is finished, in a case where the unmanned aerial vehicle utilizes the radar to perform detection, the probability feature of each target point in image of the ROI is obtained by using the above method. And the obtained probability feature of the target point is compared with the distribution feature of probability features of each type of obstacles for which statistics was made, so as to determine the type of the obstacle corresponding to the target point.

In step S408, open time for at least one airbag corresponding to the direction is determined according to the type of the obstacle below the unmanned aerial vehicle and the direction of the obstacle relative to the unmanned aerial vehicle. For example, the direction of the obstacle relative to the unmanned aerial vehicle is a direction of the obstacle relative to the center point of the cargo hold of the unmanned aerial vehicle.

The direction of the obstacle can be obtained from the radar detection image. Different open time for the at least one airbag corresponding to the direction can be set for different types of obstacles, respectively. In some embodiments, a preferential open time corresponding to the type of the obstacle is searched, and the at least one airbag corresponding to the direction of the obstacle relative to the unmanned aerial vehicle is preferentially opened relative to other airbags according to the preferential open time. The types of the obstacles can be classified according to actual needs. For example, with respect to trees, buildings, utility poles, and other obstacles that are much higher than the ground, during falling, the unmanned aerial vehicle will first hit these obstacles before falling to the ground. The airbags in the direction corresponding to these obstacles can be opened earlier than airbags in other directions. The airbags in other directions may be opened later or which airbag is to be opened can be determined according to the subsequent attitude of the unmanned aerial vehicle after crashing on the obstacle. The preferential open time corresponding to each type of obstacles is determined according to, for example, the statistical height of the type of obstacles.

In some embodiments, in the case where the unmanned aerial vehicle is in the falling state, the open time of the at least one airbag corresponding to the direction of the obstacle relative to the unmanned aerial vehicle is determined according to the vertical distance from the unmanned aerial vehicle to the ground and the type of the obstacle. Alternatively, the distance from the unmanned aerial vehicle to the obstacle is determined according to the detection of the radar, and the open time of the at least one airbag corresponding to the direction of the obstacle relative to the unmanned aerial vehicle is determined according to the distance from the unmanned aerial vehicle to the obstacle and the type of the obstacle.

In some embodiments, the distance from the unmanned aerial vehicle to the obstacle and the direction of the obstacle relative to the unmanned aerial vehicle are determined according to the detection of the radar, and the open time of the at least one airbag corresponding to the direction of the obstacle relative to the unmanned aerial vehicle is determined according to the distance from the unmanned aerial vehicle to the obstacle and the direction of the obstacle relative to the unmanned aerial vehicle. A time period from the unmanned aerial vehicle to the obstacle can be determined according to the distance from the unmanned aerial vehicle to the obstacle and the speed of the unmanned aerial vehicle, and the at least one airbag corresponding to the direction of the obstacle relative to the unmanned aerial vehicle is opened before the unmanned aerial vehicle reaches the obstacle. This embodiment can replace the steps S404 to S408.

In step S410, the airbag corresponding to the open time is opened when the open time is reached.

For example, in a case where an obstacle is detected as a tree located in the due east direction in the horizontal direction with respect to the center point of the cargo hold of the unmanned aerial vehicle, and the preferential open time is 0.5 second(s) in a case where it is determined that the obstacle is a tree, the unmanned aerial vehicle opens the airbags positioned on the due east direction with respect to the cargo after 0.5 s so as to prevent the unmanned aerial vehicle from damaging by colliding with the tree firstly. Or, in a case where an obstacle is detected as a stone located in the due west direction in the horizontal direction with respect to the center point of the cargo hold of the unmanned aerial vehicle, and the preferential open time is 1 s in a case where it is determined that the obstacle is a stone, the unmanned aerial vehicle opens the airbags positioned on the due west direction with respect to the cargo after 1 s.

Because the airbags are disposable products, replacement of the airbags is complicated. Therefore, the number of opened airbags can be reduced according to the actual situation. For example, in a case where the obstacle is grass or a sand pile, the number of opened airbags can be reduced. And the airbags may be deflated automatically after being opened. In order to ensure the protection effect, some of the airbags can be opened before other airbags.

In some embodiments, the method may also comprise step S412 after step S410. In step S412, the airbags currently located under the cargo are opened after waiting for a preset time interval after opening the airbag. Namely, after the unmanned aerial vehicle opens part of the airbags, the preset time interval corresponding to the type of the obstacle is determined according to the type of the obstacle determined before. And the airbags located under the cargo currently are opened after the preset time interval. The unmanned aerial vehicle can determine the current attitude by the gyroscope and open the airbags located under the cargo. The preset time interval may be set according to the type of the obstacle, for example, the preset time interval is 1 s when the obstacle is a tree, and the preset time interval is 0.5 s when the obstacle is an automobile.

In some embodiments, the method may also comprise steps S414-S416 after step S406. In step S414, an attitude of the unmanned aerial vehicle is adjusted according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle. In step S416, the airbags currently located under the cargo is opened. A pushing device, such as an air spraying device, may also be installed on the unmanned aerial vehicle. In the case where the unmanned aerial vehicle is in the falling state, the pushing device can promote the unmanned aerial vehicle to move horizontally to avoid the obstacle. For example, for obstacles such as people, automobiles and the like, in order to avoid safety problems caused by falling of the unmanned aerial vehicle, the unmanned aerial vehicle needs to avoid the obstacles. For obstacles such as trees, utility poles and the like, in order to avoid the situation that the unmanned aerial vehicle cannot be taken down after falling, the unmanned aerial vehicle needs to avoid the obstacles. But For obstacles such as grassland, sand pile and the like, the unmanned aerial vehicle may not need to avoid the obstacles. Due to different volumes of different obstacles, the avoidance distances of the unmanned aerial vehicle are different. Therefore, different avoiding schemes can be set according to various obstacles, and the corresponding avoiding scheme is searched for according to the type of the obstacle when the unmanned aerial vehicle is in the falling state. The unmanned aerial vehicle avoids the obstacle according to the avoiding scheme, and the avoiding scheme comprises the distance of the unmanned aerial vehicle horizontally moving from the current position.

The steps S404 to S410 are not only applicable to the situation that the unmanned aerial vehicle is in the falling state, but also applicable to the situation that the unmanned aerial vehicle flies normally or the situation that the unmanned aerial vehicle cannot steer and other out-of-control faults. And when the unmanned aerial vehicle normally flies, whether the unmanned aerial vehicle will collide with the obstacle can be judged according to the methods in the steps S404 to S410, and airbags are opened according to the type of the obstacle.

According to the method of the embodiment, the open time of the airbags, the avoiding schemes and the like can be designed and adjusted according to the actual flight environment of the unmanned aerial vehicle. By adopting the scheme in the above-mentioned embodiment, the unmanned aerial vehicle can recognize the obstacle on the ground and then take corresponding measures of protection to further improve safety of the cargo. The scheme in this disclosure is not only adapted to the protection of the cargo when the unmanned aerial vehicle in the falling state, but is also adapted to the protection of the unmanned aerial vehicle, and can also be applied to the situation of recognizing and avoiding an obstacle during the flight of the unmanned aerial vehicle.

The present disclosure also provides a cargo protection device, described below with reference to FIG. 5.

Figure 5:
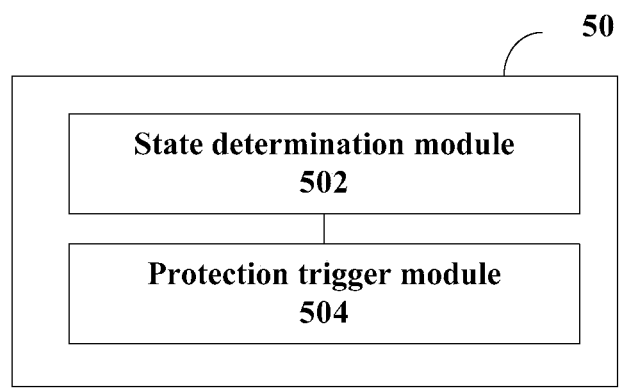
FIG. 5 shows a schematic structural view of a cargo protection device of some embodiments of the present disclosure.

FIG. 5 is a structural diagram of some embodiments of the cargo protection device of the present disclosure. As shown in FIG. 5, the apparatus 50 of this embodiment includes: a state determination module 502 and a protection trigger module 504.

The state determination module 502 is configured to determine whether an unmanned aerial vehicle is in a falling state or not according to a current acceleration in a vertical direction of the unmanned aerial vehicle and a current vertical distance from the unmanned aerial vehicle to the ground.

In some embodiments, the state determination module 502 is configured to detect the current acceleration in the vertical direction of the unmanned aerial vehicle, detect the current vertical, distance from the unmanned aerial vehicle to the ground in a case where the current acceleration reaches an acceleration threshold, and determine that the unmanned aerial vehicle is in the falling state in a case where the current vertical distance is lower than a distance threshold.

The protection trigger module 504 is configured to open at least one airbag in a cargo hold of the unmanned aerial vehicle in a case where the unmanned aerial vehicle is in the falling state to protect a cargo in the cargo hold.

The airbags are located in the cargo hold of the unmanned aerial vehicle and placed around the cargo. In some embodiments, the protection trigger module 504 is configured to determine a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state, determine open time for at least one airbag corresponding to the direction according to the type of the obstacle below the unmanned aerial vehicle and the direction of the obstacle relative to the unmanned aerial vehicle, and open the airbag corresponding to the open time when the open time is reached.

In some embodiments, the protection trigger module 504 is further configured to open the airbags currently located under the cargo after waiting for a preset time interval after opening the airbag, wherein the preset time interval is set according to the type of the obstacle.

In some embodiments, the protection trigger module 504 is further configured to adjust an attitude of the unmanned aerial vehicle according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle, and open the airbags currently located under the cargo.

Further, the protection trigger module 504 is configured to reconstruct an echo for a target point in an image of a region of interest obtained from scanning the ground with the radar on the unmanned aerial vehicle; extract a time domain feature and a frequency domain feature of the echo of the target point based on each of different azimuth angles to generate a time domain feature sequence and a frequency domain feature sequence of the target point, respectively; input the time domain feature sequence and the frequency domain feature sequence of the target point into a hidden Markov model to obtain output probabilities of the time domain feature sequence and the frequency domain feature sequence of the target point under the hidden Markov model respectively; and determine the type of the obstacle corresponding to the target point according to the probabilities of the time domain feature sequence and the frequency domain feature sequence of the target point under the hidden Markov model.

Further, the protection trigger module 504 is configured to perform a two-dimensional Fourier transform on the image of the region of interest to obtain a wavenumber domain image of the region of interest; map the wavenumber domain image into a frequency-azimuth domain according to a relationship between a frequency and an azimuth in the wavenumber domain to obtain a frequency-azimuth domain image of the region of interest; and perform an inverse Fourier transform on the frequency-azimuth domain image along an azimuth direction to obtain the echo of the target point.

Further, the protection trigger module 504 is configured to take the probabilities of the time domain feature sequence and the frequency domain feature sequence of the target point under the hidden Markov model as a probability feature of the target point, and determine the type of the obstacle corresponding to the target point according to a distribution of the probability feature of the target point and distributions of probability features of sample target points belonging to each type of obstacles.

The present disclosure also provides a cargo protection system, described below with reference to FIG. 6.

Figure 6:
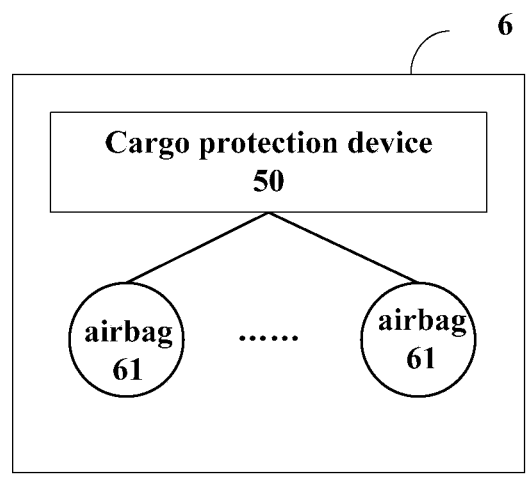
FIG. 6 shows a schematic structural view of a cargo protection system of some embodiments of the present disclosure.

FIG. 6 is a structural diagram of some embodiments of the cargo protection system of the present disclosure. As shown in FIG. 6, the system 6 of this embodiment comprises: the cargo protection device 50 of any of the above embodiments; and a plurality of airbags 61 arranged around the cargo in the cargo hold of the unmanned aerial vehicle.

In some embodiments, the airbags 61 are explosive-type airbags, which are divided into at least one airbag group according to the position of the airbags, and airbags in each of the at least one airbag group are connected to the same ignition device in parallel.

The cargo protection devices in the embodiments of the present disclosure may each be implemented by a variety of computing devices or computer systems, as described below in conjunction with FIGS. 7 and 8.

Figure 7:
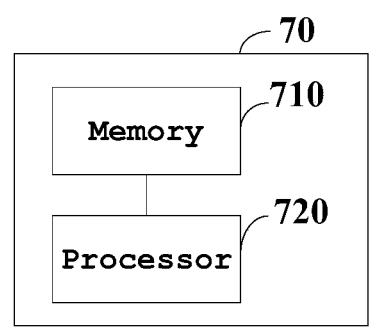
FIG. 7 shows a schematic structural view of a cargo protection device of further embodiments of the present disclosure.

FIG. 7 is a block diagram of some embodiments of the cargo protection device of the present disclosure. As shown in FIG. 7, the apparatus 70 of this embodiment includes: a memory 710 and a processor 720 coupled to the memory 710. The processor 720 is configured to perform the cargo protection method of any of the embodiments of the disclosure based on instructions stored in the memory 710.

Memory 710 may include, for example, system memory, fixed non-volatile storage medium, and the like. The system memory stores, for example, an operating system, an application program, a Boot Loader, a database, and other programs.

Figure 8:
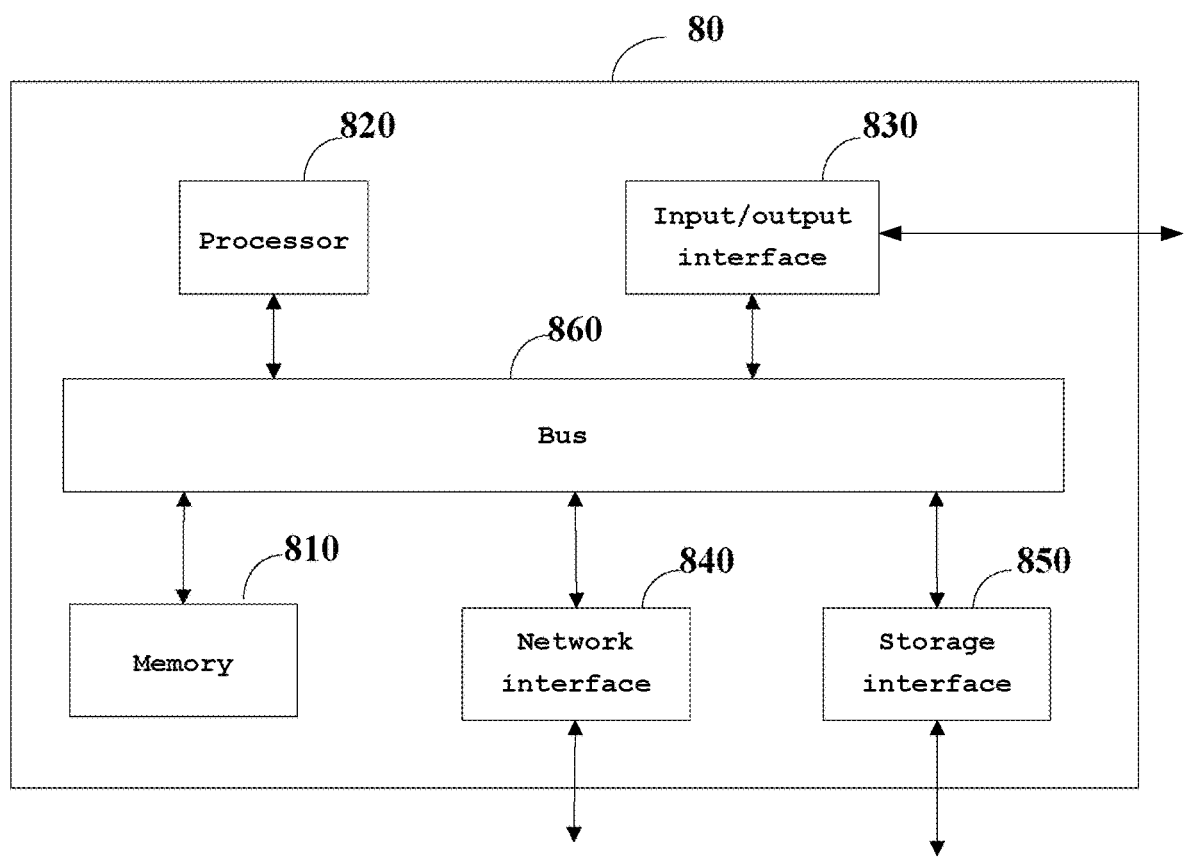
FIG. 8 shows a schematic structural view of a cargo protection device according to still further embodiments of the present disclosure.

FIG. 8 is a block diagram of further embodiments of cargo protection device of the present disclosure. As shown in FIG. 8, the device 80 of this embodiment includes: memory 810 and processor 820, the memory 810 and processor 820 being similar to memory 710 and processor 720, respectively. The cargo protection device 80 may also include an input/output interface 830, a network interface 840, a storage interface 850, and the like. These interfaces 830, 840, 850, as well as the memory 810 and the processor 820 may be connected via, for example, a bus 860. The input/output interface 830 provides a connection interface for input/output devices such as a display, a mouse, a keyboard, and a touch screen, etc. The network interface 840 provides a connection interface for various networking devices, such as a database server or a cloud storage server. The storage interface 850 provides a connection interface for external storage devices such as an SD card and a USB disk.

According to some embodiments of the present disclosure, there is provided a non-transitory computer-readable storage medium storing computer program instructions, when executed by a processor, cause the processor to perform the cargo protection method of any of the above embodiments.

As will be appreciated by one of skill in the art, embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program code embodied therein.

The present disclosure is described with reference to flowcharts and/or block diagrams of method, device (system), and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing device to produce a machine, such that the instructions executed via the processor of the computer or other programmable data processing devices generate a device configured to implement the functions specified in one or more flows of the flowchart and/or one or more blocks of the block diagram.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in one or more flows of the flowchart and/or one or more blocks of the block diagram.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps configured to implement the functions specified in one or more flows of the flowchart and/or one or more blocks of the block diagram.

The above description is meant to be illustrative of the preferred embodiments of the present disclosure and not to be taken as limiting the disclosure, and any modifications, equivalents, improvements and the like that are within the spirit and scope of the present disclosure are intended to be included therein.

What is claimed is:

1. A cargo protection method, comprising:
    determining whether an unmanned aerial vehicle is in a falling state or not according to a current acceleration in a vertical direction of the unmanned aerial vehicle and a current vertical distance from the unmanned aerial vehicle to the ground; and
    opening at least one airbag in a cargo hold of the unmanned aerial vehicle in a case where the unmanned aerial vehicle is in the falling state to protect a cargo in the cargo hold,
    wherein opening at least one airbag in the cargo hold of the unmanned aerial vehicle in the case where the unmanned aerial vehicle is in the falling state comprises:
        determining a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state;
        determining open time for at least one airbag corresponding to the direction according to the type of the obstacle below the unmanned aerial vehicle and the direction of the obstacle relative to the unmanned aerial vehicle; and
        opening the airbag corresponding to the open time when the open time is reached.

2. The cargo protection method according to claim 1, wherein the determining of whether the unmanned aerial vehicle is in the falling state or not according to the current acceleration in the vertical direction of the unmanned aerial vehicle and the current vertical distance from the unmanned aerial vehicle to the ground comprises:
    detecting the current acceleration in the vertical direction of the unmanned aerial vehicle;
    detecting the current vertical distance from the unmanned aerial vehicle to the ground in a case where the current acceleration reaches an acceleration threshold; and
    determining that the unmanned aerial vehicle is in the falling state in a case where the current vertical distance is lower than a distance threshold.

3. The cargo protection method according to claim 1, further comprising:
    opening the airbags currently located under the cargo after waiting for a preset time interval after opening the airbag,
    wherein the preset time interval is set according to the type of obstacle.

4. The cargo protection method according to claim 1, further comprising:
    adjusting an attitude of the unmanned aerial vehicle according to the type of obstacle and the direction of the obstacle relative to the unmanned aerial vehicle to avoid the obstacles, after determining the type of the obstacle below the unmanned aerial vehicle and the direction of the obstacle relative to the unmanned aerial vehicle; and
    opening the airbags currently located under the cargo.

5. The cargo protection method according to claim 1, wherein determining the type of the obstacle below the unmanned aerial vehicle according to the information obtained from scanning the ground with the radar on the unmanned aerial vehicle comprises:
    reconstructing an echo for a target point in an image of a region of interest obtained from scanning the ground with the radar on the unmanned aerial vehicle;
    extracting a time domain feature and a frequency domain feature of the echo of the target point based on each of different azimuth angles to generate a time domain feature sequence and a frequency domain feature sequence of the target point, respectively;
    inputting the time domain feature sequence and the frequency domain feature sequence of the target point into a hidden Markov model to obtain output probabilities of the time domain feature sequence and the frequency domain feature sequence of the target point under the hidden Markov model, respectively; and determining the type of the obstacle corresponding to the target point according to the probabilities of the time domain feature sequence and the frequency domain feature sequence of the target point under the hidden Markov model.

6. The cargo protection method according to claim 5, wherein reconstructing the echo of the target point in the image of the region of interest comprises:

performing a two-dimensional Fourier transform on the image of the region of interest to obtain a wavenumber domain image of the region of interest;

mapping the wavenumber domain image into a frequency-azimuth domain according to a relationship between a frequency and an azimuth in the wavenumber domain to obtain a frequency-azimuth domain image of the region of interest; and performing an inverse Fourier transform on the frequency-azimuth domain image along an azimuth direction to obtain the echo of the target point.

7. The cargo protection method according to claim 5, wherein determining the type of the obstacle corresponding to the target point according to the probabilities of the time domain feature sequence and the frequency domain feature sequence of the target point under the hidden Markov model comprises:

taking the probabilities of the time domain feature sequence and the frequency domain feature sequence of the target point under the hidden Markov model as a probability feature of the target point; and determining the type of the obstacle corresponding to the target point according to a distribution of the probability feature of the target point and distributions of probability features of sample target points belonging to each type of obstacles.

8. A non-transitory computer-readable storage medium storing computer program instructions, when executed by a processor, cause the processor to:

determine whether an unmanned aerial vehicle is in a falling state or not according to a current acceleration in a vertical direction of the unmanned aerial vehicle and a current vertical distance from the unmanned aerial vehicle to the ground; and open at least one airbag in a cargo hold of the unmanned aerial vehicle in a case where the unmanned aerial vehicle is in the falling state to protect a cargo in the cargo hold, wherein opening at least one airbag in the cargo hold of the unmanned aerial vehicle in the case where the unmanned aerial vehicle is in the falling state comprises:

determining a type of an obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state;

determining open time for at least one airbag corresponding to the direction according to the type of the obstacle below the unmanned aerial vehicle and the direction of the obstacle relative to the unmanned aerial vehicle; and opening the airbag corresponding to the open time when the open time is reached.

9. The non-transitory computer-readable storage medium to claim 8, wherein the determining of whether the unmanned aerial vehicle is in the falling state or not according to the current acceleration in the vertical direction of the unmanned aerial vehicle and the current vertical distance from the unmanned aerial vehicle to the ground comprises:

detecting the current acceleration in the vertical direction of the unmanned aerial vehicle;

detecting the current vertical distance from the unmanned aerial vehicle to the ground in a case where the current acceleration reaches an acceleration threshold; and determining that the unmanned aerial vehicle is in the falling state in a case where the current vertical distance is lower than a distance threshold.

10. A cargo protection device, comprising:

a processor; and a memory coupled to the processor and storing instructions that when executed by the processor, cause the processor to:

determine whether an unmanned aerial vehicle is in a falling state or not according to a current acceleration in a vertical direction of the unmanned aerial vehicle and a current vertical distance from the unmanned aerial vehicle to the ground; and open at least one airbag in a cargo hold of the unmanned aerial vehicle in a case where the unmanned aerial vehicle is in the falling state to protect a cargo in the cargo hold, wherein opening at least one airbag in the cargo hold of the unmanned aerial vehicle in the case where the unmanned aerial vehicle is in the falling state comprises:

determining a type of an Obstacle below the unmanned aerial vehicle and a direction of the obstacle relative to the unmanned aerial vehicle according to the information obtained from scanning the ground with a radar on the unmanned aerial vehicle in the case where the unmanned aerial vehicle is in the falling state;

determining open time for at least one airbag corresponding to the direction according to the type of the obstacle below the unmanned aerial vehicle and the direction of the obstacle relative to the unmanned aerial vehicle; and opening the airbag corresponding to the open time when the open time is reached.

11. The cargo protection device according to claim 10, wherein the determining of whether the unmanned aerial vehicle is in the falling state or not according to the current acceleration in the vertical direction of the unmanned aerial vehicle and the current vertical distance from the unmanned aerial vehicle to the ground comprises:

detecting the current acceleration in the vertical direction of the unmanned aerial vehicle;

detecting the current vertical distance from the unmanned aerial vehicle to the ground in a case where the current acceleration reaches an acceleration threshold; and determining that the unmanned aerial vehicle is in the falling state in a case where the current vertical distance is lower than a distance threshold.

12. The cargo protection device according to claim 10, the memory further storing instructions which, when executed by a processor, cause the processor to:

open the airbags currently located under the cargo after waiting for a preset time interval after opening the airbag, wherein the preset time interval is set according to the type of the obstacle.

13. The cargo protection device according to claim 10, the memory further storing instructions which, when executed by a processor, cause the processor to:
- adjust an attitude of the unmanned aerial vehicle according to the type of the obstacle and the direction of the obstacle relative to the unmanned aerial vehicle to avoid the obstacles, after determining the type of the obstacle below the unmanned aerial vehicle and the direction of the obstacle relative to the unmanned aerial vehicle; and
- open the airbags currently located under the cargo.

14. The cargo protection device according to claim 10, wherein determining the type of the obstacle below the unmanned aerial vehicle according to the information obtained from scanning the ground with the radar on the unmanned aerial vehicle comprises:
- reconstructing an echo for a target point in an image of a region of interest obtained from scanning the ground with the radar on the unmanned aerial vehicle;
- extracting a time domain feature and a frequency domain feature of the echo of the target point based on each of different azimuth angles to generate a time domain feature sequence and a frequency domain feature sequence of the target point, respectively;
- inputting the time domain feature sequence and the frequency domain feature sequence of the target point into a hidden Markov model to obtain output probabilities of the time domain feature sequence and the frequency domain feature sequence of the target point under the hidden Markov model, respectively; and
- determining the type of the obstacle corresponding to the target point according to the probabilities of the time domain feature sequence and the frequency domain feature sequence of the target point under the hidden Markov model.

15. The cargo protection device according to claim 14, wherein reconstructing the echo of the target point in the image of the region of interest comprises: performing a two-dimensional Fourier transform on the image of the region of interest to obtain a wavenumber domain image of the region of interest;
- mapping the wavenumber domain image into a frequency-azimuth domain according to a relationship between a frequency and an azimuth in the wavenumber domain to obtain a frequency-azimuth domain image of the region of interest; and
- performing an inverse Fourier transform on the frequency-azimuth domain image along an azimuth direction to obtain the echo of the target point.

16. The cargo protection device according to claim 14, wherein determining the type of the obstacle corresponding to the target point according to the probabilities of the time domain feature sequence and the frequency domain feature sequence of the target point under the hidden Markov model comprises:
- taking the probabilities of the time domain feature sequence and the frequency domain feature sequence of the target point under the hidden Markov model as a probability feature of the target point; and
- determining the type of the obstacle corresponding to the target point according to a distribution of the probability feature of the target point and distributions of probability features of sample target points belonging to each type of obstacles.

17. A cargo protection system, comprising:
the cargo protection device of the claim 10; and
a plurality of airbags arranged around the cargo in the cargo hold of the unmanned aerial vehicle.

18. The cargo protection system according to claim 17, wherein the airbags are explosive-type airbags, which are divided into at least one airbag group according to the position of the airbags, and airbags in each of the at least one airbag group are connected to the same ignition device in parallel.

* * * * *